United States Patent [19]

Lapsys

[11] 4,386,809
[45] Jun. 7, 1983

[54] DRIVING-GUIDANCE SYSTEM FOR A RESILIENT VEHICLE PROPULSION BAND

[75] Inventor: Algis L. Lapsys, Bloomfield Hills, Mich.

[73] Assignee: The United States of America as represented by the Secretary of the Army, Washington, D.C.

[21] Appl. No.: 244,548

[22] Filed: Mar. 16, 1981

[51] Int. Cl.³ .................... B62D 55/24; B62D 55/30
[52] U.S. Cl. ........................................ 305/31; 305/39
[58] Field of Search ................. 305/7, 31, 35 EB, 39, 305/29

[56] References Cited

U.S. PATENT DOCUMENTS

| 388,763 | 8/1888 | Conger | 305/35 EB X |
| 1,868,148 | 7/1932 | McMillan et al. | 305/31 X |
| 2,110,587 | 3/1938 | Bennett et al. | 305/31 X |

FOREIGN PATENT DOCUMENTS

| 248413 | 2/1961 | Australia | 305/31 |
| 565512 | 1/1924 | France | 305/39 |
| 413729 | 7/1934 | United Kingdom | 305/35 EB |

*Primary Examiner*—David A. Scherbel
*Attorney, Agent, or Firm*—Peter A. Taucher; John E. McRae

[57] ABSTRACT

In a ground vehicle having resilient endless bands engaged with the terrain for suspension and propulsion purposes, improved novel roller arrangements for maintaining a desired band envelope under adverse operating conditions, such as large vehicle accelerations or decelerations, movement over rough bumpy terrain, or vehicle turning actions.

7 Claims, 3 Drawing Figures

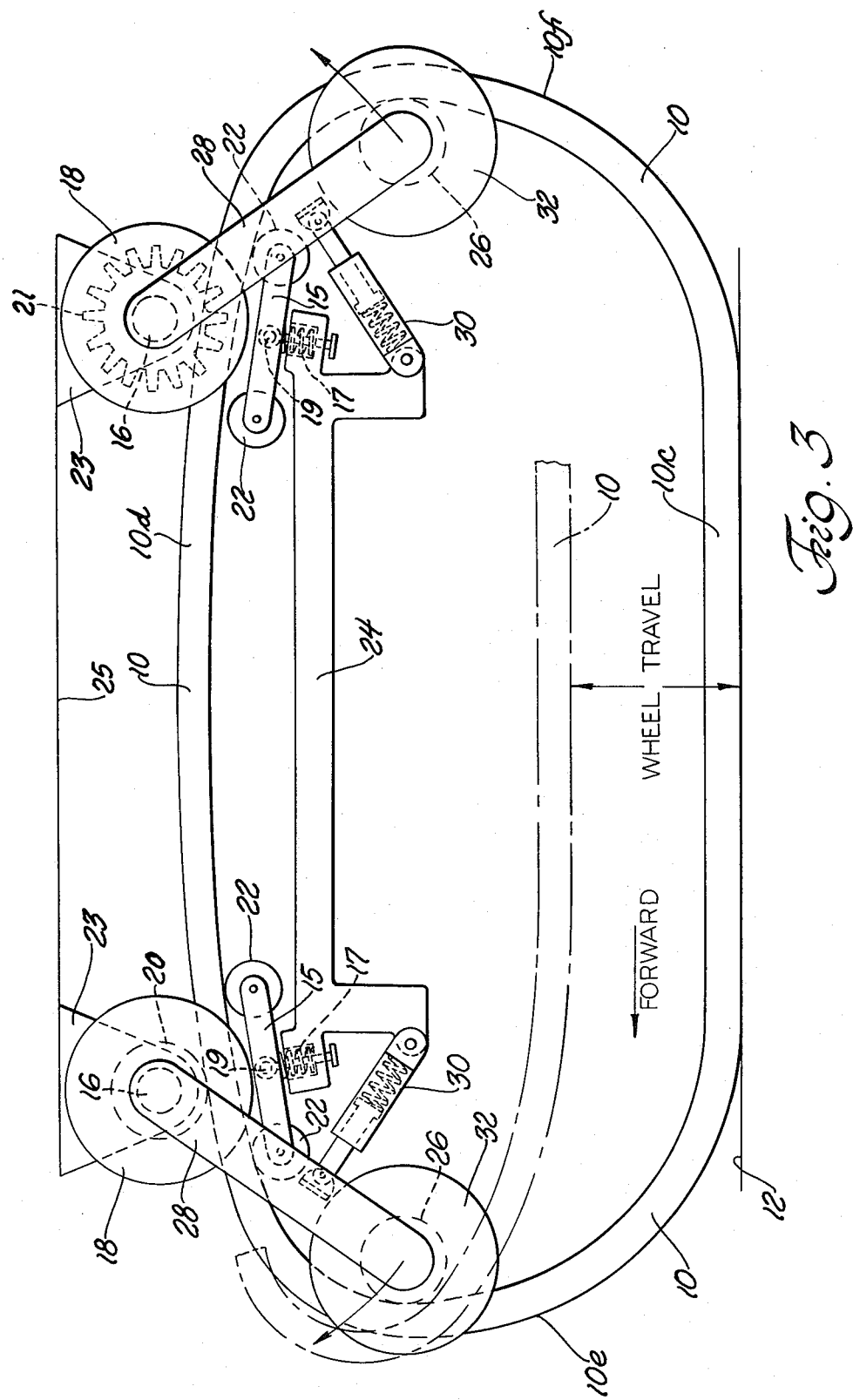

DRIVING-GUIDANCE SYSTEM FOR A RESILIENT VEHICLE PROPULSION BAND

The invention described herein may be manufactured, used, and licensed by or for the Government for governmental purposes without payment to me of any royalty thereon.

BACKGROUND AND SUMMARY OF THE INVENTION

This invention relates to vehicles having endless ground-engaged bands for supporting the vehicles and moving same across the terrain. U.S. Pat. No. 2,055,932 shows a vehicle of this general type. The Lockheed Missile & Space Co. of Huntsville, Alabama, has developed a similar vehicle which it designates as the loop-wheel vehicle, which is taken to mean wheels in the form of elongated rolling loops. These vehicles are somewhat similar to tracked vehicles or crawler vehicles in that the loops or bands have extensive area engagement with the terrain. However the bands or loops differ from conventional tracks in that they incorporate resilient materials or elements, whereby said bands function as resilient vehicle suspension devices. My invention is directed to improved mechanisms for guiding the resilient bands to prevent band malfunction or derailment in the presence of adverse operating factors such as high acceleration or deceleration, or operation at high speeds over bumpy irregular terrain.

THE DRAWINGS

FIG. 3 shows a side elevational view of a preferred form of band guidance mechanism embodying my invention.

Figure 1:
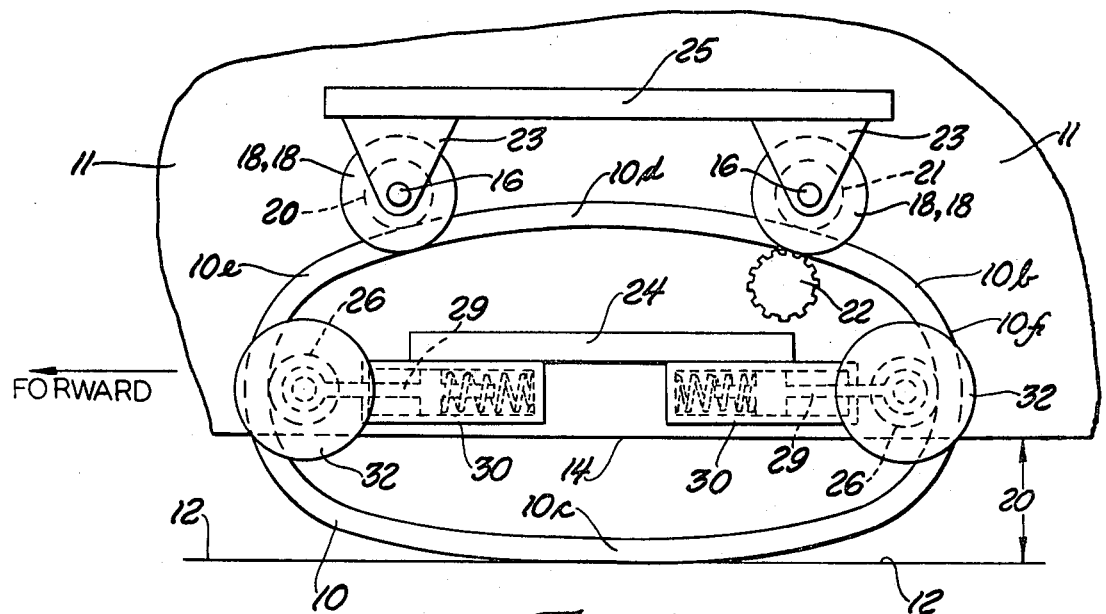
FIG. 1 is a side elevational view of a rudimentary form of a band guidance system embodying my invention.

Referring more particularly to FIG. 1, there is shown a vehicle suspension-propulsion system comprising an endless resilient band 10 arranged alongside a vehicle body or hull 11 having an undersurface 14 normally spaced above the ground or terrain 12 by a clearance distance 20. The vehicle is equipped with two outwardly projecting ledges or sponsons 24 and 25 for supporting certain roller devices used to guide and drive resilient band 10 along ground surface 12. The structure shown in FIG. 1 is duplicated at the other side of the vehicle. In most cases the vehicle would have two sets of resilient bands, one set near the forward end of the vehicle and a second set near the trailing end of the vehicle, as shown in U.S. Pat. No. 2,055,932.

Figure 2:
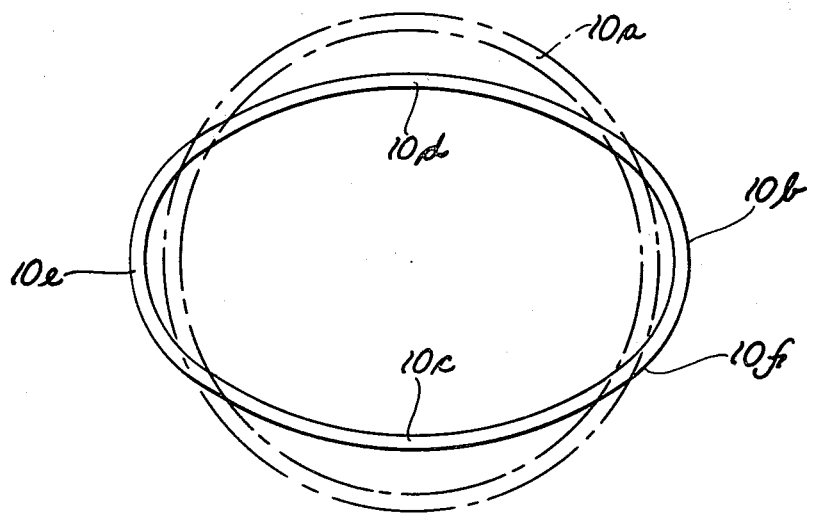
FIG. 2 shows a resilient band as manufactured, and after being placed under load at a side of the vehicle.

For purposes of the present invention resilient band 10 may be formed of various different materials and laminations. For example, one suitable band construction is that used in the aforementioned Lockheed loop-wheel concept comprising a resilient multi-ply glass fiber core having an encapsulating rubber sheath. U.S. Pat. No. 2,055,932 shows a resilient band that is apparently formed of spring steel having rubber treads thereon, see column 2, line 75. These constructions or other multi-ply band structures formed by conventional pneumatic tire fabrication techniques can be used in the practice of my invention. The character of each band 10 will be determined by the weight of the vehicle and expected service conditions, such as road speed, type of terrain and maneuverability requirement. In the as-manufactured state band 10 will preferably assume a circular configuration, as shown at 10a in FIG. 2; when the band is installed on a vehicle to bear a portion of the vehicle weight the band will assume a generally elliptical configuration as shown at 10b in FIG. 2. The installed band 10b will have an elongated lower run 10c engaged with the terrain, an elongated upper run 10d spaced above the terrain, and curved end sections 10e and 10f connecting the lower and upper runs. One of the band support rollers (FIG. 1) will have a driving engagement with the band to advance the band and associated vehicle along the terrain. Generally two bands will be arranged at each side of the vehicle, as shown in U.S. Pat. No. 2,055,932.

My improved band guidance system, as shown in FIG. 1, comprises two load rollers 20 and 21 having their shafts 16 mounted in brackets 23 suitably affixed to sponson 25. Each roller 20 or 21 is provided with two axially-spaced radial flanges 18 that overlap the band lateral edges to preclude sidewise slippage of the band 10 upper run 10d, i.e. into or out of the plane of the paper. Rollers 20 and 21 are the sole instrumentalities for transferring the weight of the vehicle onto resilient band 10. These rollers are spaced and located so that each load roller carries approximately the same load.

The band 10 envelope is maintained against longitudinal deformation or distortion by means of two floating end rollers 26, each having two axially-spaced radial flanges 32 that overlap the band lateral edges to preclude sidewise slippage of the band 10 curved end sections 10e and 10f, i.e. into or out of the plane of the paper. The support shaft for each roller 26 is carried in a bearing located on a piston rod 29 of a spring mechanism 30 carried by sponson 24. Each spring mechanism acts to continuously bias the associated end roller 26 outwardly into pressure engagement with the band surface. During movement of the vehicle over uneven terrain the load rollers 20 and 21 will at certain times apply increased downward forces on band 10, thereby forcing upper run 10d toward lower run 10c or vice versa; such relative movement of the upper and lower runs causes the band end sections 10e and 10f to expand away from each other. Spring mechanisms 30 maintain rollers 26 in pressure engagement with the inner surfaces of the band, thereby counteracting the tendency of the band to be derailed from the end rollers.

In the FIG. 1 structure load roller 21 is a powered roller having a frictional driving engagement with the upper surface of band 10; an idler reaction roller 22 is engaged with the inner surface of the band to prevent momentary disconnection of the band from roller 21. During normal steady state conditions the load forces associated with the vehicle sprung mass interact with resilient elements within the band to pressurize the band into engagement with roller 21.

During forward movement of the vehicle the driving force of roller 21 will cause rear end section 10f of the band to be in longitudinal tension, to thereby exert a relatively high pressure force on the associated roller 26; front end section 10e of the band will be in longitudinal compression to exert a relatively low force on the associated roller 26. To prevent longitudinal shift of the band envelope it may be desirable to construct the rear spring mechanism 30 with a higher force or rate than the front spring mechanism 30. Each spring mechanism is equipped with suitable bump stop surfaces for limiting the deflection of the associated roller 26 in accordance with expected magnitude of the band contraction-expansion movements. Since both end rollers are floating rollers each end roller is required to deflect a lesser distance than would a single end roller for a given anti-derailment action.

FIG. 3 illustrates a preferred form of the invention wherein each end roller 26 is carried on a pair of swingable arms 28 that can rotate on the adjacent shaft 16 for load roller 20 or 21; the load rollers and arms 28 are rotationally independent of one another. It will be noted that load rollers 20 and 21 are located above and between end rollers 26 so that arms 28 swing outwardly and upwardly under the impetus of spring mechanism 30. During relative movement of upper run 10d toward lower run 10c the band end sections 10e and 10f tend to move outward and upward as denoted by the dashed lines in FIG. 1. Due to the angulations of arms 28 end rollers 26 will tend to move with the band end sections, thereby accomplishing the anti-derailment action with minimum disturbance to the natural band envelope, and/or destructive force build-ups.

Drive roller 21 includes two axially spaced sprockets that mesh with regularly spaced openings along the length of band 10. Four reaction rollers 22 are located below each roller 20 or 21 to prevent momentary separation of the band from the load rollers. Each set of reaction rollers comprises two laterally spaced front rollers and two laterally spaced rear rollers carried on a walking beam 15 that is pivotally mounted about is midpoint on a transverse shaft 19. One or more compression springs 17 are trained between sponson 24 and beam 15 to bias the beam bodily upwardly toward the upper run of band 10, to thereby maintain equalized loadings on rollers 22.

In the FIG. 3 embodiment spring mechanism 30 is trained between each end of the vehicle sponson 24 and the adjacent swing arm 28. The spring mechanism can incorporate a hydraulic shock absorber therein. Thus, the piston within mechanism 30 can have metering values therein for controlled flow of hydraulic fluid from one side of the piston to the other. Use of a shock absorber minimizes undesired vibration and/or overtravel of the spring mechanism.

I wish it to be understood that I do not desire to be limited to the exact details of construction shown and described for obvious modifications will occur to a person skilled in the art.

I claim:

1. In a military ground vehicle supported at its sides on endless resilient bands, each band including a lower run engageable with the ground, an upper run spaced above the ground, and curved end sections connecting the lower and upper runs; the improvement comprising two floating end rollers engageable with inner surfaces of the band end sections; a spring mechanism continuously biasing each end roller into pressure engagement with the respective band surface when the band end sections move away from each other incident to movement of the upper and lower runs toward each other; two load rollers carried by the vehicle in pressure engagement with the upper surface of the band upper run; said load rollers being located above and between the end rollers so that each load roller carries approximately the same load; each of the four rollers having axially-spaced radial flanges overlapping the band lateral edges to preclude sidewise slippage of the band off of the rollers.

2. The improvement of claim 1: each load roller including a mounting shaft; each end roller being floatably mounted on the vehicle by means of an arm mechanism (28) that is swingably carried by the mounting shaft for the adjacent load roller.

3. The improvement of claim 2: each of the aforementioned spring mechanisms being trained between the vehicle and one of the above-mentioned arm mechanisms.

4. The improvement of claim 1: one of the load rollers constituting a drive roller for the band; said one load roller having driver teeth projecting into longitudinally-spaced openings in the band to produce band movement.

5. The improvement of claim 4, and further comprising reaction roller means spaced substantially directly below the drive roller to engage the undersurface of the band upper run, thereby preventing undesired disconnection of the band from the driver teeth on the drive roller.

6. The improvement of claim 5: said reaction roller means comprising two longitudinally-spaced rollers and a walking beam mount structure which provides substantially equal band loadings on the two reaction rollers.

7. The improvement of claim 4, and further comprising a reaction roller means spaced substantially directly below each load roller to engage the undersurface of the band upper run, thereby preventing undesired disconnection of the band from the load rollers; each reaction roller means comprising a walking beam mounted for pivotal motion about its midpoint on a horizontal axis transverse to the plane of motion of the band, spring means (17) baising the walking beam upwardly toward the upper run of the band, and band-engaged rollers carried on the ends of the walking beam.

* * * * *